United States Patent
Roberson et al.

(10) Patent No.: US 7,330,955 B2
(45) Date of Patent: Feb. 12, 2008

(54) RECOVERY RECORD FOR UPDATING A SYSTEM CONFIGURATION

(75) Inventors: Randy L. Roberson, New Port Richey, FL (US); Tarun Thakur, Colorado Springs, CO (US); Clark Edward Lubbers, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 275 days.

(21) Appl. No.: 10/967,615

(22) Filed: Oct. 18, 2004

(65) Prior Publication Data

US 2006/0085617 A1   Apr. 20, 2006

(51) Int. Cl.
*G06F 12/00* (2006.01)

(52) U.S. Cl. .................................................. 711/170

(58) Field of Classification Search ................ 711/170, 711/156, 161, 162, 166; 713/100; 714/6; 707/204

See application file for complete search history.

(56) References Cited

U.S. PATENT DOCUMENTS

| | | | |
|---|---|---|---|
| 5,276,860 A | 1/1994 | Fortier et al. | |
| 5,632,027 A | 5/1997 | Martin et al. | |
| 5,752,250 A | 5/1998 | Minatogawa et al. | |
| 5,761,678 A | 6/1998 | Bendert et al. | |
| 5,961,625 A | 10/1999 | Carter | |
| 6,058,455 A | 5/2000 | Islan et al. | |
| 6,195,695 B1 | 2/2001 | Cheston et al. | |
| 6,243,773 B1 | 6/2001 | Mahalingam | |
| 6,282,670 B1 * | 8/2001 | Rezaul Islam et al. | 714/6 |
| 6,308,287 B1 | 10/2001 | Mitchell et al. | |
| 6,338,126 B1 | 1/2002 | Ohran et al. | |
| 6,427,198 B1 | 7/2002 | Berglund et al. | |
| 6,438,563 B1 | 8/2002 | Kawagoe | |
| 6,438,606 B1 | 8/2002 | Ward | |
| 6,477,612 B1 | 11/2002 | Wang | |
| 6,584,499 B1 | 6/2003 | Jantz et al. | |
| 6,625,754 B1 | 9/2003 | Aguilar et al. | |
| 6,629,111 B1 | 9/2003 | Stine et al. | |
| 6,671,777 B1 | 12/2003 | Krehbiel et al. | |
| 6,684,293 B1 | 1/2004 | Backman et al. | |
| 6,687,849 B1 | 2/2004 | Cherf | |
| 6,697,971 B1 | 2/2004 | Dwyer | |
| 6,701,421 B1 | 3/2004 | Elnozahy et al. | |
| 6,715,055 B1 | 3/2004 | Hughes | |
| 6,718,466 B1 | 4/2004 | Duwe et al. | |
| 6,732,171 B2 | 5/2004 | Hayden | |

(Continued)

FOREIGN PATENT DOCUMENTS

JP     01140342 A     6/1989

(Continued)

*Primary Examiner*—Hiep T. Nguyen
(74) *Attorney, Agent, or Firm*—Fellers, Snider, et al.

(57) ABSTRACT

A data storage system is provided comprising memory allocation information associated with a change in a system configuration of memory allocation within a memory space, and means for updating the system configuration by saving the memory allocation information before updating the system configuration. A recovery record comprises memory allocation information associated with the change in system configuration of memory allocation, and a completion indicator comprises a first value if the memory allocation information is included in the system configuration and comprises a second value if the memory allocation information is not included in the system configuration.

15 Claims, 8 Drawing Sheets

U.S. PATENT DOCUMENTS

| | | |
|---|---|---|
| 6,769,022 B1 | 7/2004 | DeKoning et al. |
| 6,779,130 B2 | 8/2004 | Sprunt et al. |
| 2003/0172150 A1 | 9/2003 | Kennedy |
| 2003/0177307 A1* | 9/2003 | Lewalski-Brechter ....... 711/114 |
| 2004/0028069 A1* | 2/2004 | Tindal et al. ............... 370/429 |
| 2004/0243991 A1* | 12/2004 | Gustafson et al. .......... 717/168 |
| 2005/0144609 A1* | 6/2005 | Rothman et al. ........... 717/168 |

FOREIGN PATENT DOCUMENTS

| | | |
|---|---|---|
| WO | WO 00/23890 | 4/2000 |

* cited by examiner

RECOVERY RECORD FOR UPDATING A SYSTEM CONFIGURATION

FIELD OF THE INVENTION

The present invention relates generally to computer systems, and more particularly, but without limitation, to maintaining system configuration integrity during updates associated with memory allocations.

BACKGROUND

Computer systems can comprise input devices, output devices, one or more CPUs and storage media such as semiconductor RAM, EEPROM, disc drives, CD drives, or other storage media. An operating system provides an application environment and a file system for allocating (and deallocating) storage capacity as files are created, modified, or deleted. Specialized computer systems, such as servers and storage arrays, for example, also employ a file system for allocating storage capacity that is accessed through a network or other connection. Servers and storage arrays store files across a plurality of disc drives, depending on a desired storage format, such as a RAID level, for example. User data files are mapped to one or more areas on one or more disc drives. Mapping includes storage of mirror data or parity data. Configuration information describing the manner in which data files are mapped to one or more disc drives is contained in tables or other data structure termed metadata. As files are created, modified, or deleted, metadata is updated to reflect the allocation or deallocation of storage capacity.

Systems can be multi-threaded and multi-tasking, simultaneously executing a number of processes. Abnormal execution of one process (such as a system process or user application) can cause one or more processes to end in an incomplete manner. While operating systems strive to provide an operating environment where abnormal execution of one application does not affect other applications, conditions such as bus failures, memory errors, code errors, power failures, power surges, or other conditions can result in a system crash. Storage capacity allocation or de-allocation processes can be operating when system execution is halted by a crash, possibly resulting in erroneous allocation or de-allocation and loss of data.

SUMMARY OF THE INVENTION

As embodied herein and as claimed below, the present invention is generally directed to a device and associated method for updating computer system configuration information.

In some embodiments a recovery record is provided that is stored in a memory space. The recovery record comprises memory allocation information associated with a change in a system configuration of memory allocation of the space, and a completion indicator comprising a first value when the memory allocation information is included in the system configuration and comprising a second value when the memory allocation information is not included in the system configuration.

In other embodiments a method is provided comprising: storing memory allocation information associated with a change in a system configuration of memory allocation of a memory space; and assigning a first value to a completion indicator indicating that the memory allocation information is not included in the system configuration.

In other embodiments a data storage system is provided comprising system configuration change information associated with a change in a system configuration, and means for updating the system configuration by saving the system configuration change information before updating the system configuration.

These and various other features and advantages which characterize the embodiments of the claimed invention will become apparent upon reading the following detailed description and upon reviewing the associated drawings.

DETAILED DESCRIPTION

Figure 1:
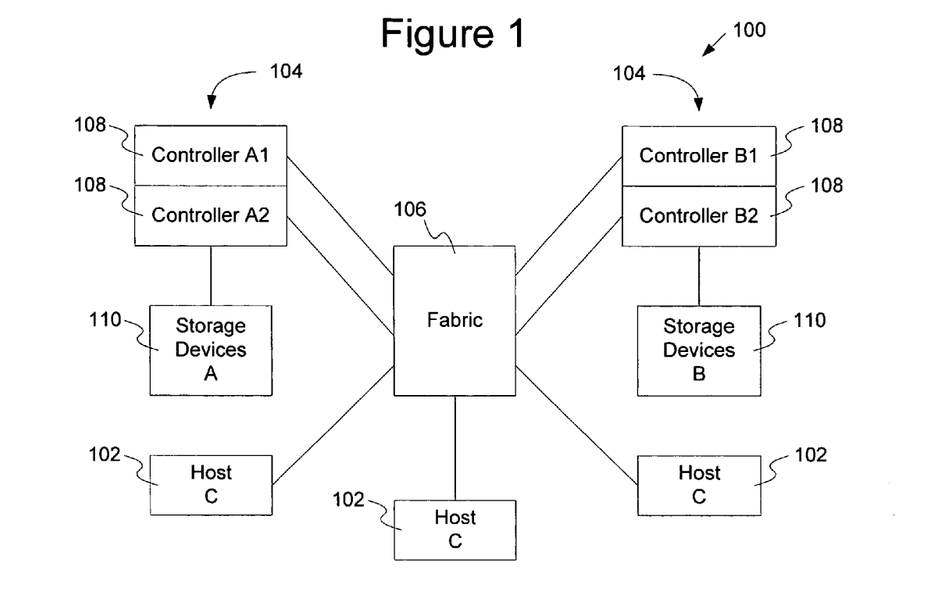
FIG. 1 is a top level functional block depiction of a computer-based system characterized as a wide-area network utilizing mass storage.

To illustrate an exemplary environment in which presently preferred embodiments of the present invention can be advantageously practiced, FIG. 1 shows a computer-based system 100 characterized as a wide area network (WAN) utilizing mass storage.

The system 100 includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as fibre-channel based switching network, although other configurations can be utilized as well including the Internet.

Each array 104 includes a pair of controllers 108 (denoted A1, A2 and B1, B2) and a set of data storage devices 110 preferably characterized as hard disc drives operated as a RAID (redundant array of independent discs). The controllers 108 and data storage devices 110 preferably utilize a fault tolerant arrangement so that the various controllers 108 utilize parallel, redundant links and at least some of the user data stored by the system 100 is stored in a redundant format within at least one set of the data storage devices 110.

It is further contemplated that the A host computer 102 and the A data storage array 104 can be physically located at a first site, the B host computer 102 and B storage array 104 can be physically located at a second site, and the C host computer 102 can be yet at a third site, although such is merely illustrative and not limiting.

Figure 2:
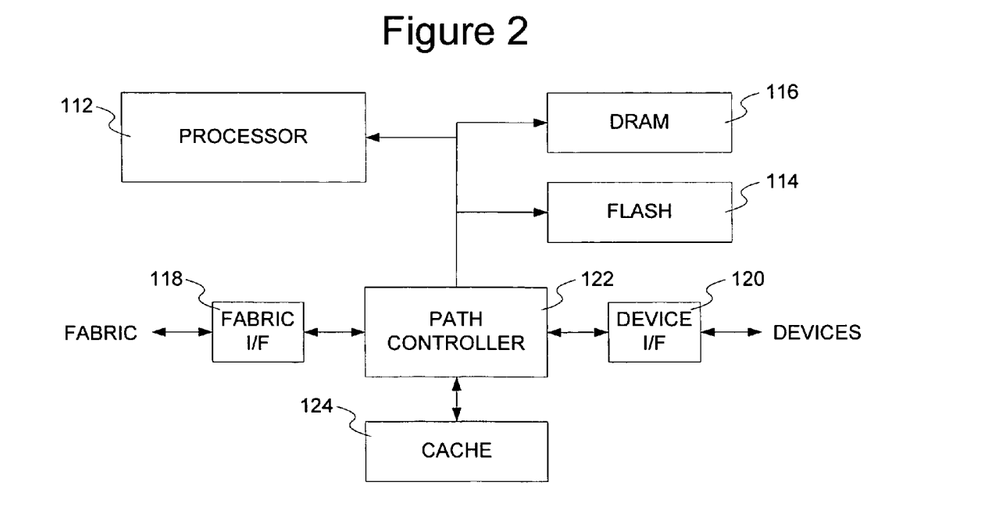
FIG. 2 provides a functional block diagram to illustrate a selected one of the controllers of FIG. 1

FIG. 2 illustrates a selected one of the controllers 108 in greater detail. The controller 108 can be embodied in a single integrated circuit, or distributed among a number of discrete circuits as desired. A main processor 112, preferably characterized as a programmable, computer processor, provides top level control in accordance with programming steps and processing data stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 120 communicates with the storage devices 110. The I/F circuits 118, 120 and a path controller 122 form a communication path to pass commands and data between the storage array 104 and the host 102, such as by employing the cache memory 124. Although illustrated discretely, it will be understood that the path controller 122 and the I/F circuits 118, 120 can be unitarily constructed.

The data storage capacity of an array 104, defined by the extent of the data storage devices 110 in a given array 104, is organized into ordered files that can be written to and read from the array 104. System configuration information defines the relationship between user data files, including any associated parity and mirror data, with the respective storage locations. The system configuration furthermore identifies the relationship between blocks of storage capacity allocated to user files and the memory storage locations, such as logical block addresses. The system configuration can furthermore include virtualization by defining virtual block addresses that are mapped to logical block addresses.

System configuration information is changed when storage capacity is allocated, such as when saving new files or enlarging existing files, or after storage capacity is deallocated, such as when deleting files or reducing the size of existing files. System metadata defines file allocation information and other data structures that support allocation processes.

Figure 3:
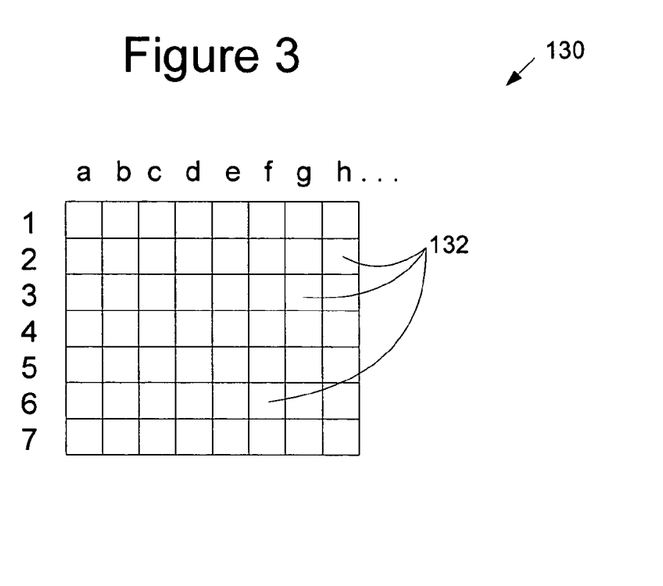
FIG. 3 is a diagrammatic illustration of a metadata structure.

FIG. 3 is a simplified diagrammatical representation of a metadata structure 130 in the form of a bit array. For purposes of illustration, the columns of the metadata 130 (a, b, c, d, . . . ) can relate to one or more of the data storage devices 110 in the array 104. Rows of the metadata 130 (1, 2, 3, 4, . . . ) can represent a preselected storage capacity of the one or more drives. Accordingly, each bit in the array 130, at the intersection of each row and column, represents one allocatable unit of storage capacity. Bits in the array 130 are set to a first value if the respective unit of storage capacity has been allocated, and set to a second value if the unit of storage capacity is allocatable.

Figure 4:
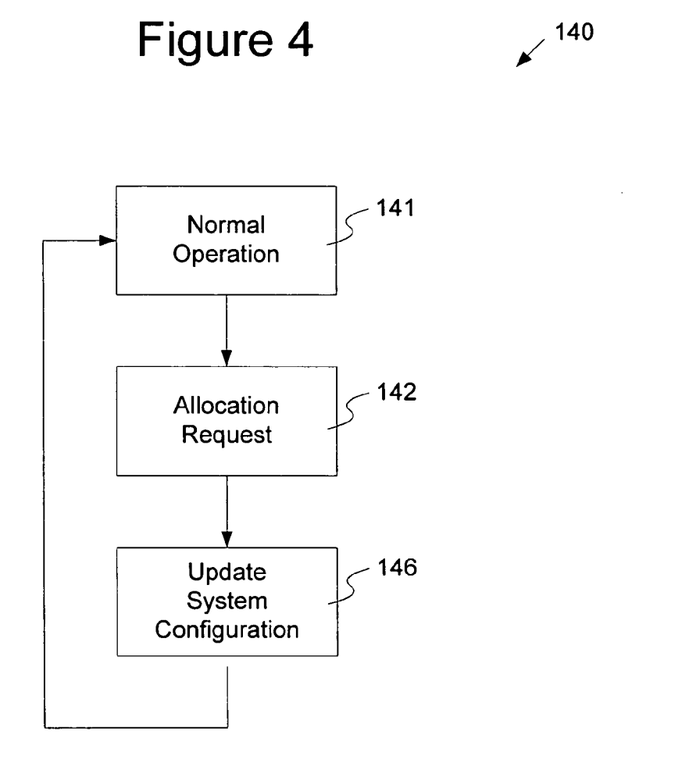
FIG. 4 is a flowchart illustrating steps for practicing a one-pass update of the system configuration information in accordance with embodiments of the present invention.

The metadata 130 thus represents a summary of the system configuration with respect to the storage capacity utilization. Updating the metadata 130 involves altering the indicator bit data to reflect the change in allocation from the state before the allocation, for example at time $t_0$, to the state after the allocation at time $t_1$. Preferably, the updating takes place as a one-pass process, as illustrated by the flowchart of FIG. 4. The update process 140 begins in block 141 where normal operations of the computer system 100 occur until such time that an allocation request occurs in block 142. The system 100 allocates the associated memory in block 146 and updates the metadata accordingly. The updated metadata is made available to the system 100 for reference during continued operation and during the next allocation request 142.

If an error occurs in the system 100 during the updating step 146, such as in the event of a system 100 crash, the system 100 can be faced with attempting a restart with partially updated metadata. Embodiments of the present invention contemplate a solution to that problem by providing the opportunity for a two-pass recovery process of the metadata 130.

Figure 5:
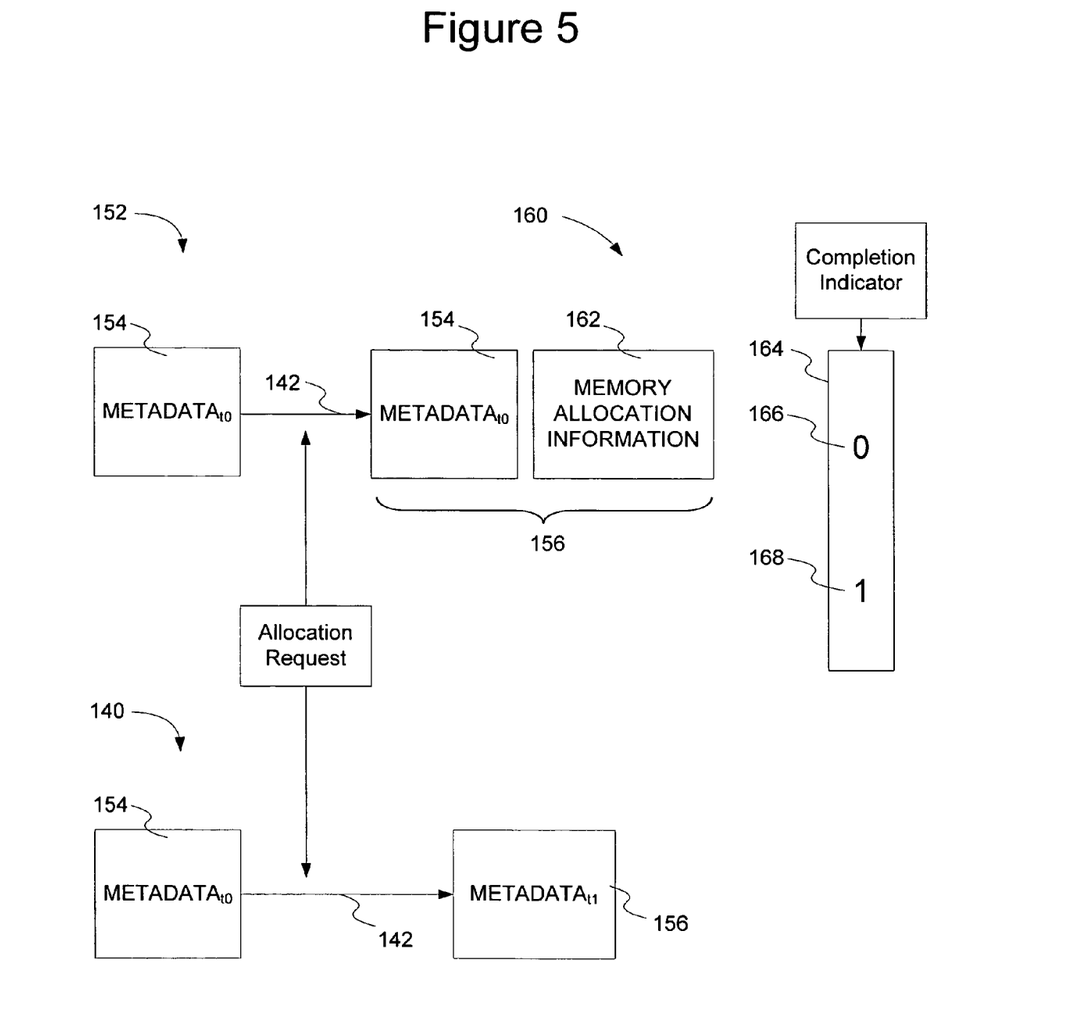
FIG. 5 is a diagrammatic illustration of one-pass and two-pass processes for updating system configuration information in accordance with embodiments of the present invention.

FIG. 5 is a simplified diagrammatical representation to illustrate differences between the one-pass metadata update process 140 (FIG. 4) and a two-pass metadata update process 152. The system configuration is defined by the metadata at time $t_0$, before the allocation request 142, and at time $t_1$, after the allocation request 142. The state of the metadata before the allocation request 142 is designated in block 154 as METADATA$_{t0}$. The state of the metadata following the allocation request 142 and a successful update is designated in block 156 as METADATA$_{t1}$.

In the two-pass process 152, a recovery record 160 is created comprising a stored record of the MEMORY ALLOCATION INFORMATION 162 ("MAI"). The MAI 162 comprises information associated with the changes in the system configuration due to the allocation request 142. The recovery record 160 farther comprises a COMPLETION INDICATOR 164 comprising a first value 168 if the MAI 162 is included in the system configuration and comprising a second value 166 if the MAI 162 is not included in the system configuration. That is, in the two-pass process 152, the system configuration is defined by a combination METADATA$_{t0}$ with the MAI 162, both of which are individually stored in memory. Preferably, both are stored in nonvolatile memory for recovery in the event of a momentary power loss, such as in a structure similar to that set forth in FIG. 3. When the METADATA$_{t0}$ and the MAI 162 are successfully combined, as indicated by a change of the COMPLETION INDICATOR 164, that combination then defines the state of the system 100 configuration after the allocation request 142 as METADATA$_{t1}$ 156.

Recalling FIG. 3, the metadata 130 can be characterized as a memory allocation map, of which the MAI 162 defines only that part that is changed as a result of the allocation request 142. In various embodiments of the present invention the MAI 162 can be configured to report useful information such as, without limitation, the availability of a respective data storage unit 132 for allocation, a total number of available data storage units for allocation, and the number of available data storage units per zone in a mapping arrangement employing zoned storage capacity. In alternative embodiments the MAI 162 can be assigned to a designated logical device. In further embodiments, the recovery record 160 can furthermore comprise code, such as without limitation executable code, to automatically update the system configuration to include the MAI 162.

Figure 6:
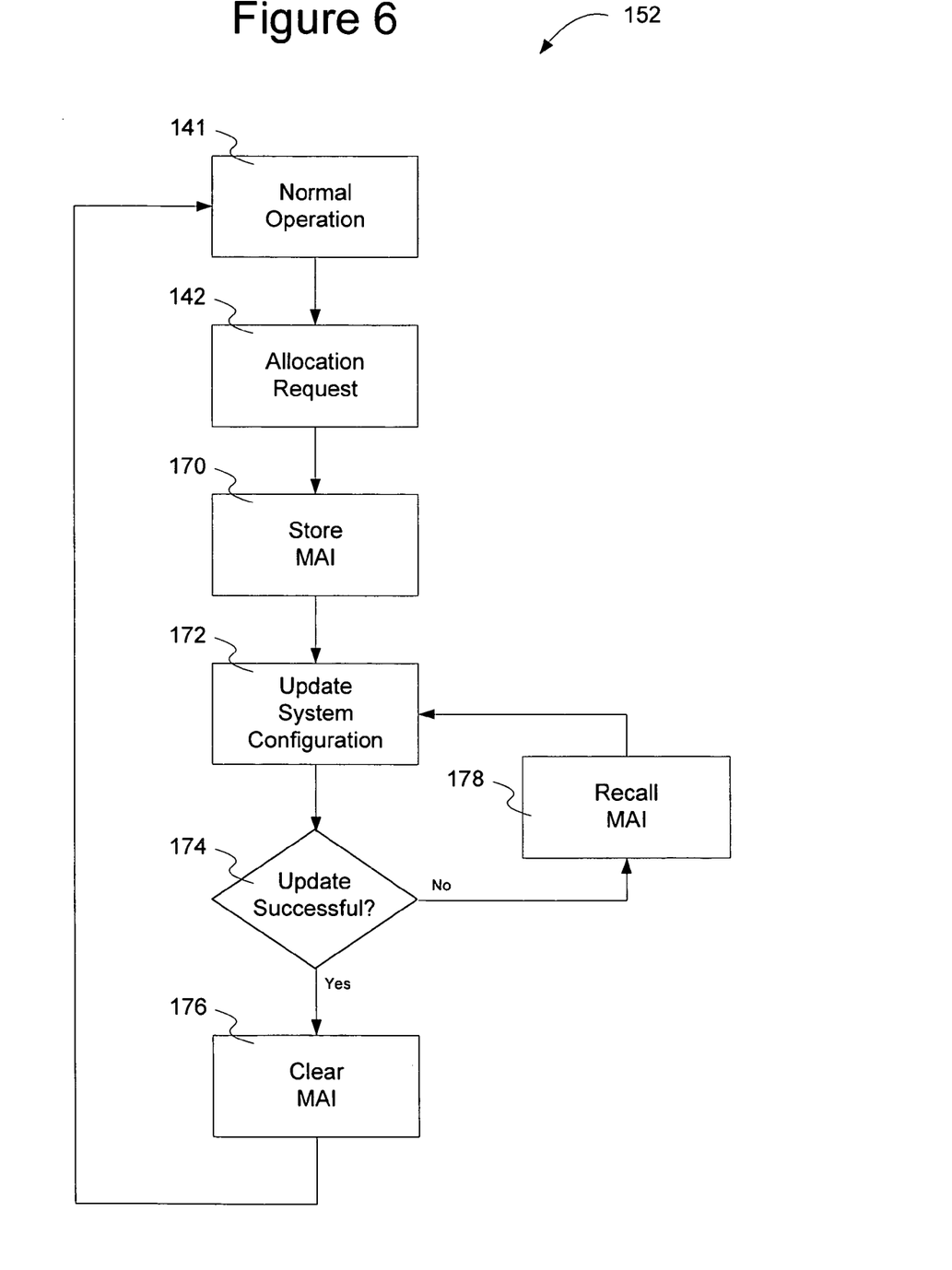
FIG. 6 is a flowchart illustrating steps for practicing a two-pass update of the system configuration information in accordance with embodiments of the present invention.

FIG. 6 provides a flowchart illustrating a two-pass UPDATE process 152 in accordance with embodiments of the present invention. During normal operations in block 141, eventually an allocation request in block 142 is encountered. Based on the system 100 response to the allocation request, the MAI 162 is determined and stored in block 170. In block 172 the system configuration is updated with the MAI 162. Control then passes to block 174 where it is determined whether the system configuration update in block 172 was completed successfully. In some embodiments this can be determined by checking the status of the completion indicator 164. If the update was successful, then the MAI is cleared in block 176 and control returns to normal operation at block 141. If the update was not successful, such as in the case of a system 100 crash during the updating step of block 172, then the MAI 162 is recalled in block 178 and control passes back to the updating step 172.

The storing MAI 162 step in block 170 preferably includes storing a copy of the MAI 162 for backup purposes. More particularly, in some embodiments it is advantageous to mirror the MAI 162 in write back cache memory. As discussed above, the store MAI 162 step in block 170 can also advantageously include a variety of information, such as the availability of a particular data storage unit for allocation, the total number of available data storage units for allocation, and the total number of available data storage units per zone in a mapped arrangement of zoned capacity.

It will now be appreciated that the various preferred embodiments of the present invention generally contemplate a data storage system 100 comprising memory allocation information 162 associated with a change in a system 100 configuration of memory allocation, and means for updating the system 100 configuration by saving the memory allocation information 162 before updating the system configuration. This is generally defined by a two-pass process of first saving the memory allocation information 162 and then updating the system configuration.

The means for updating is characterized by an indicator means, such as without limitation the completion indicator 164, indicating whether the memory allocation information 162 is included in the system 100 configuration. The means for updating is characterized by a means for mapping, such as without limitation the metadata 130, the system 100 configuration allocatability. The means for updating is characterized by a means for indicating the allocatability of the system 100 configuration, such as without limitation the allocatability of a particular data storage unit 132. The means for indicating can alternatively indicate the total number of data storage units that are available for allocation, as well as the number of data storage units per zone that are available for allocation in a zoned capacity arrangement.

Figure 7:
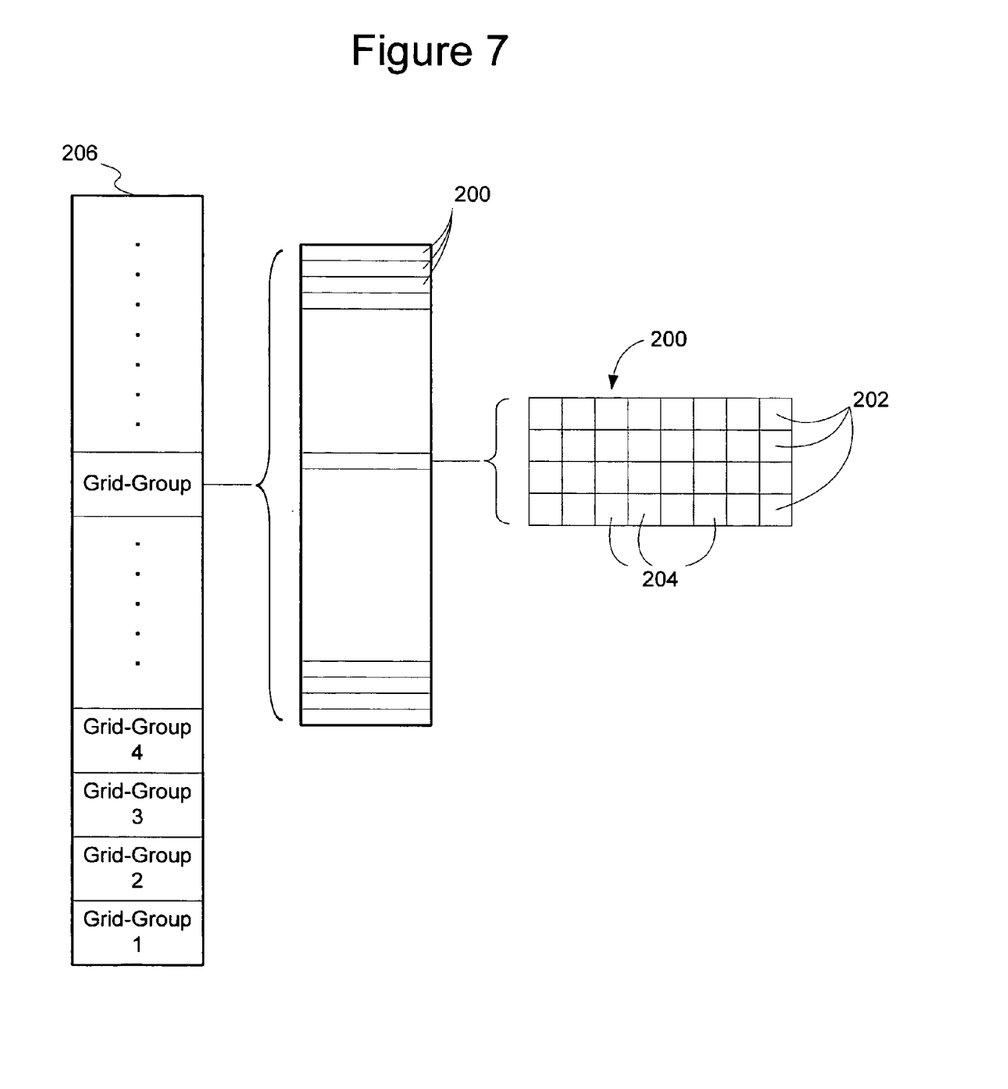
FIGS. 7-10 depict illustrative metadata structure and a memory allocation information record that are suited for use with embodiments of the present invention.

FIG. 7 is a more detailed illustrative example of a grid-based type data storage system. Storage capacity is organized into a plurality of grids 200, each grid 200 having a plurality of rows 202 and having a plurality of columns 204. Columns 204 in the grid 200 correspond to each of the plurality of data storage devices 110 (FIG. 1), and each row 202 of the grid 200 corresponds to a plurality of stripes, with one stripe in each of the data storage devices 110 (FIG. 1). A stripe is a predetermined amount of capacity beginning at a logical block address.

Continuing with FIG. 7 and in view of FIG. 3, grids 200 can be grouped into a plurality of grid-groups 206, each having a predetermined number of grids 200. One or more stripes in a grid 200 can comprise an assignable unit. Stripes can be designated as containing user information, mirror data, or parity data. For example, a mirror data stripe is a copy of a user information stripe; a parity stripe contains parity data calculated from two or more user information stripes. A set of user information stripes, and associated mirror data stripes or parity data stripes, defines the data storage unit 132.

Depending on the storage format, such as RAID level, for example, grids 200 can contain different numbers of data storage units 132. Configuring all the data storage units 132 in a particular grid 200 as the same storage format and allocating all data storage units 132 in the grid 200 to the same logical device is advantageous in simplifying the metadata 130 arrangement for processing. Grid-groups 206 can be allocated to a logical device and grids 200 within the grid-groups 206 assigned to the logical device as needed. A number can be assigned to each grid 200 of the plurality of grids 200 and the grids 200 can be assigned to a logical device with respect to the grid numbers, such as but not limited to in a sequential manner. The number of the first grid 200 in a grid-group 206 can serve as a grid-group 206 identifier, or other numbers or identifiers can be assigned to grid-groups.

Figure 8:
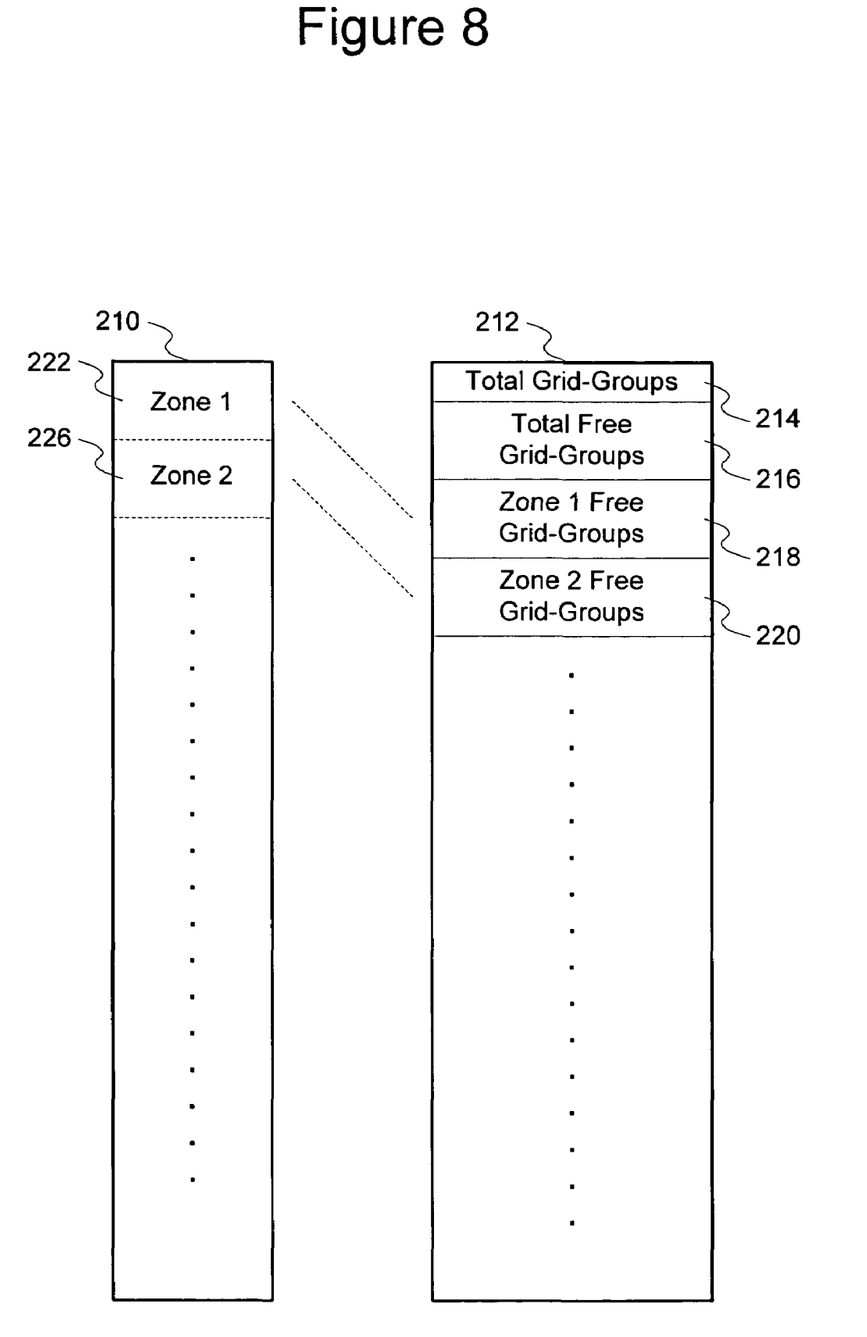

FIG. 8 diagrammatically illustrates metadata for the grid-based storage system 100 of FIG. 7. Grid-group metadata can include a grid-group allocation map (GGAM) 210 and a grid-group allocation summary table (GGAST) 212. GGAM 210 is a storage allocation map having one bit for each grid-group 206 in the system 100 wherein bits in the GGAM are set to a first value if corresponding grid-groups 206 are free and are set to a second value if corresponding grid-groups 206 have been allocated. Locating where free grid groups 206 are located can be simplified through the GGAST 212. GGAST 212 can contain a count of the total number of grid-groups 214, a count of the number of free grid groups 216, and a count of the number of free grid-groups within zones of the GGAM 218, 220. For example, zone 1 free grid-groups 218 contains the number of free grid-groups within a first zone 222 of GGAM 210. Similarly, zone 2 free grid-groups 220 contains the number of free grid-groups within a second zone 226 of GGAM 210. By checking the number of free grid-groups within a zone 222, 226, the location of free storage capacity can be more quickly identified than by parsing the GGAM 210. As grid-groups 206 are allocated or de-allocated, the GGAM 210 and GGAST 212 are updated.

Figure 9:
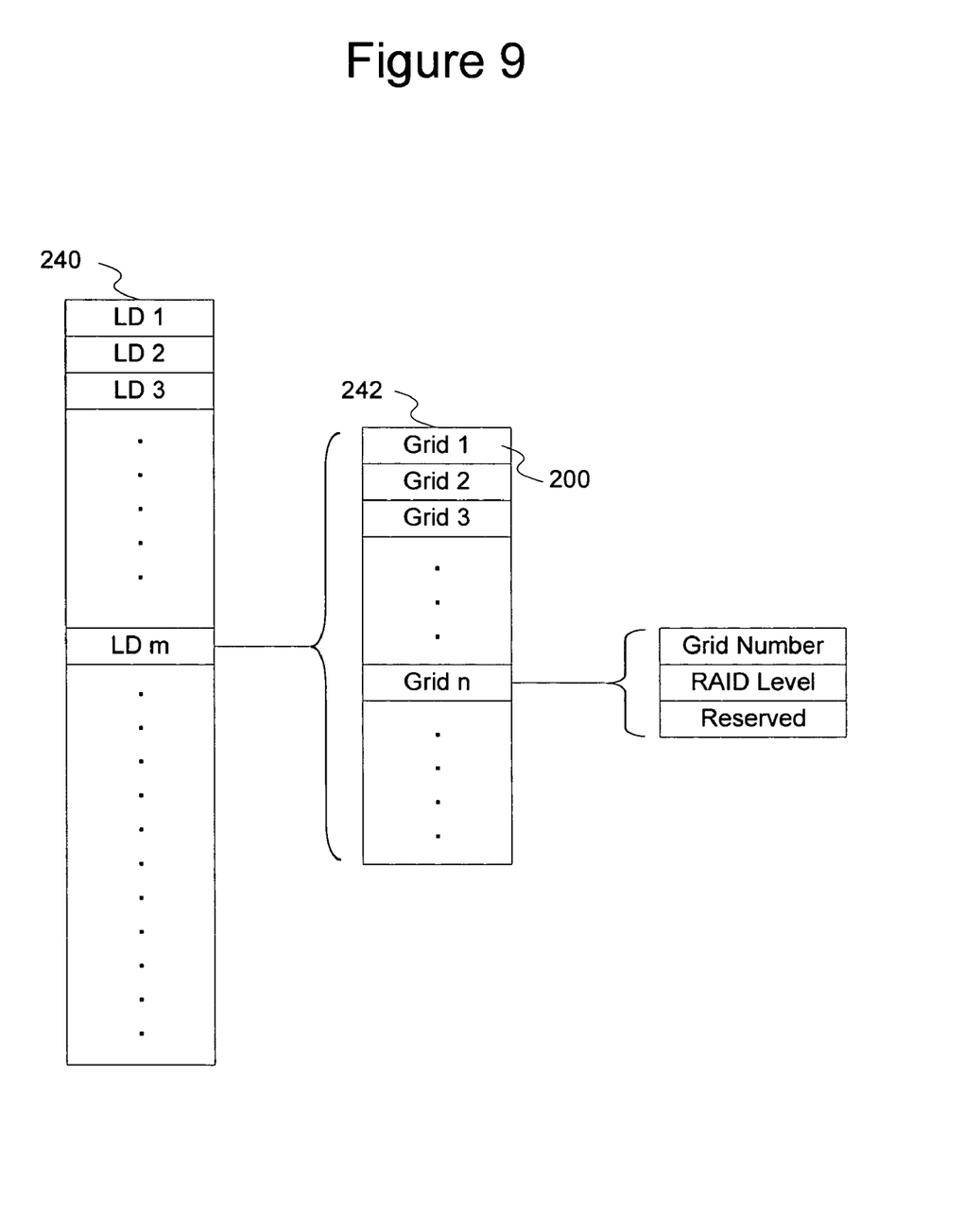

FIG. 9 depicts metadata for logical device allocation in the grid-based data storage system of FIG. 7. The metadata comprises a logical device allocation map (LDAM) 240 that has a logical device grid table (LDGT) 242 for each logical device. The LDGT 242 is a listing of grids 200 and/or grid groups 206 that are assigned to the logical device, and can include other information such as RAID level, for example. The LDAM 240 can be organized such that the location of an LDGT 242 within the LDAM 240 for a particular logical device can be accessed by using the logical device number, or logical device number multiplied by a predetermined value, as an offset into the LDAM 240. In other words, the logical device number can be used to access the LDAM 240 and access the LDGT 242. Other addressing methods can be employed as well.

Preferably, an allocation request 142 (FIG. 6) will specify a logical device number and the amount of storage capacity to be allocated or de-allocated. The current system configuration is determined by accessing the metadata, such as by accessing the GGAM 210 and the GGAST 212. If the allocation request 142 specifies an existing logical device, as can be specified for de-allocation, or increase in size of an existing logical device, the LDAM 240 and the LDGT 242 can be accessed for the logical device number specified.

The storage capacity selected to meet the allocation request 142 can be determined by evaluating the GGAST 212 for the requested capacity, and evaluating the count of free grid-groups in each zone to identify where sufficient free grid-groups exist. The GGAM 212 can then be used to select one or more free grid-groups to provide the requested storage capacity. The GGAM 212 can also be employed to select storage that is contiguous to or in proximity to other storage allocated to an existing volume if the allocation request 142 specifies increasing the size of an existing logical device.

Once the allocation determination has been made, the respective changes must be reflected in the system 100 configuration. This can be accomplished by copying that portion of the GGAM 210 affected by the changes in allocation in defining the MAI 162 (FIG. 5). Indicators, such as indicator bits within the MAI 162, can be set to a first value if corresponding grid-groups are allocated, or set to a second value if corresponding grid groups are de-allocated. Advantageously, by storing the updated metadata values in the MAI 162 (FIG. 5), in contrast to making the changes incrementally or decrementally, the system configuration can be updated multiple times using the same MAI 162, or can be partially updated (as can be interrupted by a system 100 crash) and then be later completely updated.

It will be noted that advantageously the MAI 162 consists only of resultant data, and not formulaic data, such that it is not used to reinitiate any processes during the updating of the system configuration. In this manner, the recovery record 160 requires no intelligence or decision-making for crash recovery. Rather, the crash recovery involves only mechanistic calculations such as address determinations and writes. The recovery code of the recovery record 160 does not need to know what the higher level operation was that got interrupted. In the context of crash recovery, whether the operation being recovered was an allocation or deallocation does not matter; the updated metadata values are just stored to the respective locations.

This arrangement makes the recovery code both simple and reliable. The actual address of where to write a particular updated metadata value can be implied by the value's location in the recovery record 160, implied by reference to other constructs (i.e. logical device number), or explicit with an actual address in the recovery record 160. Particularly advantageous is that this permits the recovery record 160 to be used in code for an idempotent updating of the system configuration, ensuring the fastest recovery possible. Addresses identifying locations within the system 100 configuration can be written to the MAI 162 for each map, table or other data structure to be updated. Alternatively, information within the MAI 162, such as the logical device numbers and grid numbers, can provide information from which the metadata address can be generated. Further, the location of update information within the MAI 162 can be employed to indicate the data structure to be updated. For example, the count of free grid-groups can occupy a predefined location within the MAI 162.

Figure 10:
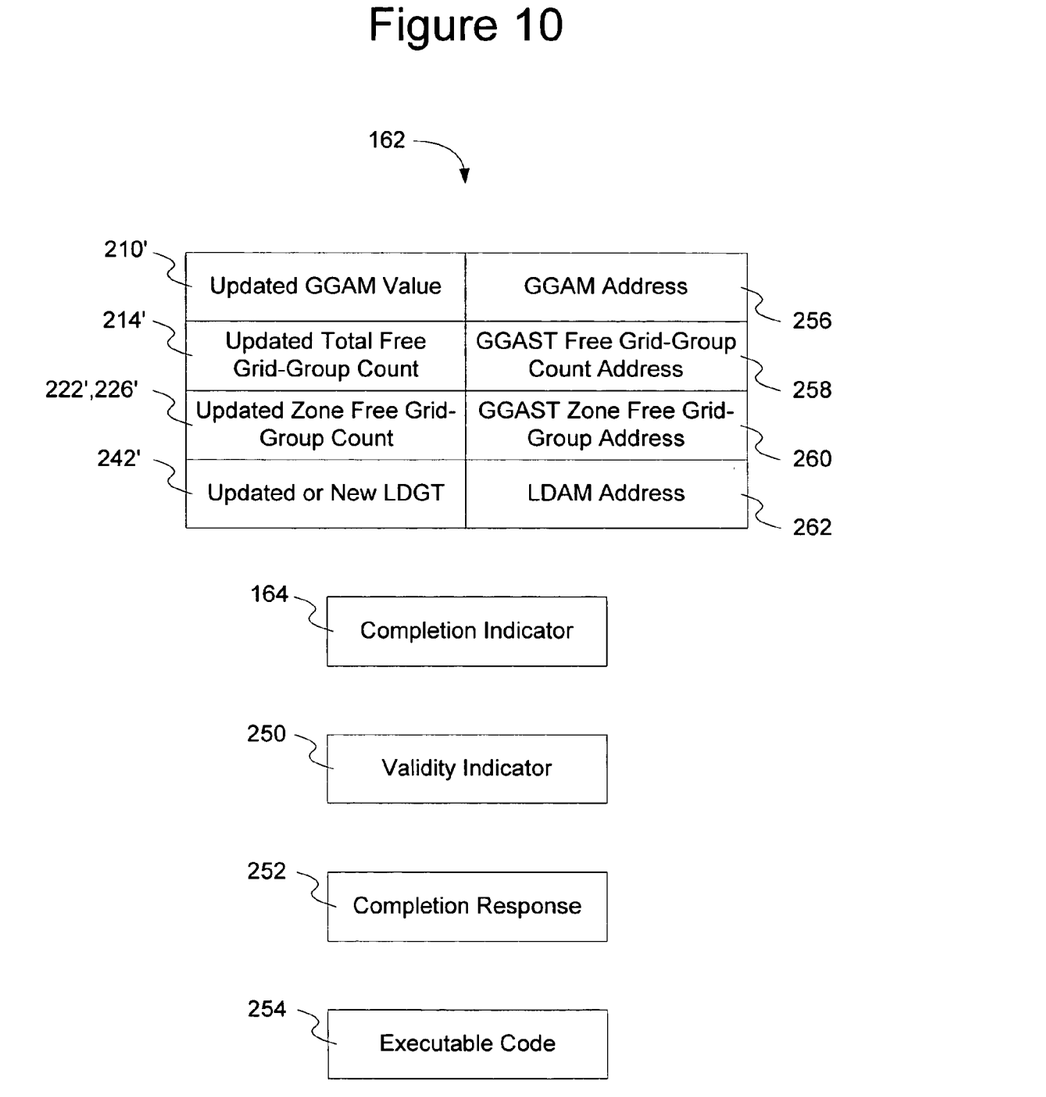

An example format for storing data in a MAI 162 is shown in FIG. 10. Like items retain like reference numerals, with the primes indicating values of the MAI 162 associated with the changes in allocation. A validity indicator 250, such as a checksum or other encoding method, can be employed to check the validity of the MAI 162. The completion indicator 164 can comprise a flag or other data element that is set to a predetermined value to indicate that the updates contained in the MAI 162 have not been applied to the system 100 configuration. Completion response information 252, that can comprise an allocation request opcode, a reply message, a return code, or other data elements identifying the allocation request, can be written to the MAI 162. Executable code 254 can be generated such that the MAI 162 is an executable element that updates the system 100 configuration. For example, an autoexec file, upon reboot or restart, can call an executable MAI 162 record.

The MAI 162 record of FIG. 10 comprises an updated GGAM value 210', an updated count of total free grid-groups 214', an updated count of free grid-groups 222', 226' for at least one zone of the GGAM 210, and a new or updated LDGT 242' for a logical device number. In some embodiments, the portion of the GGAM 210 being updated and the zone for which a free grid-group count is being updated can be determined from the grid numbers contained in the LDGT 242.

Alternatively, MAI 162 record can include a GGAM address 256 that specifies a starting location in the GGAM 210 to which the update is to be written, a free grid-group count address 258 that specifies the address of the total free grid group count in the GGAST 212, a GGAM zone free grid-group count address 260 that specifies the address in the GGAST 212 of one free grid-group count for one zone, and an LDAM address 262 that specifies the address of the LDGT 242 for one logical device.

While the foregoing description has employed a grid-based storage architecture, embodiments of the present invention are not limited to a particular storage architecture. An allocatable unit represents an amount of storage capacity allocated to a logical device. While foregoing examples have employed a grid-group as an allocatable unit, embodiments of the present invention are not limited as to the organization or size of an allocatable unit and can include a stripe as an allocatable unit, for example.

While the foregoing examples are directed to configuration of data storage systems (and can be applied to storage systems employing any media including but not limited to disc drives, WORM drives, writeable CD ROMS, DVDs, EEPROM, semiconductor RAM, and EEPROM), embodiments of the present invention can be applied to other hardware and software configurable elements of computer systems including component and connection configurations, such as network interfaces and graphics adapters, and to software configurations, such as application environment settings, register settings, passwords, and the like. For example, methods of the present invention can be applied to setting a password such that if a crash occurs while the password is being changed and the password is corrupted, a recovery record can be employed to write a non-corrupted password. As such, a metadata update request represents any request that updates configuration information of a system.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular metadata structure without departing from the spirit and scope of the present invention.

What is claimed is:

1. A recovery record stored in memory comprising:
   memory allocation information embodied in a computer readable medium and defining resultant data that is prospectively associated with a change in a system configuration of memory allocation of a memory space corresponding to a pending allocation request; and
   a completion indicator embodied in a computer readable medium and comprising a first value when the memory allocation information is included in the system configuration and comprising a second value when the memory allocation information is not included in the system configuration.

2. The recovery record of claim 1 wherein the memory allocation information defines a portion of a memory allocation map representing a plurality of allocatable data storage units when the memory allocation information is included in the system configuration.

3. The recovery record of claim 2 wherein the memory allocation information indicates an availability of a respective data storage unit for allocation.

4. The recovery record of claim 2 wherein the memory allocation information further indicates a number of data storage units available for allocation.

5. The recovery record of claim 2 wherein the memory allocation map comprises a first zone and a second zone and wherein the memory allocation information indicates an availability of data storage units with respect to the zones.

6. The recovery record of claim 2 wherein the memory allocation information specifies an allocatable data storage unit assignment to a logical device.

7. The recovery record of claim 1 comprising memory allocation information adapted for idempotent update of the system configuration to include the memory allocation information.

8. A method comprising:
storing memory allocation information defining resultant data that is prospectively associated with a change in a system configuration of memory allocation of a memory space corresponding to a pending allocation request; and
storing a first value to a completion indicator indicating that the memory allocation information is not included in the system configuration.

9. The method of claim 8 comprising:
updating the system configuration to include the memory allocation information; and
storing a second value different than the first value to the completion indicator indicating the memory allocation information is included in the system configuration.

10. The method of claim 8 comprising storing a copy of the memory allocation information in the memory space.

11. The method of claim 10 comprising mirroring the copy in write back cache.

12. The method of claim 8 comprising indicating with the memory allocation information an availability of a data storage unit for allocation.

13. The method of claim 9 wherein the updating step is characterized as idempotent.

14. The method of claim 8 wherein the system configuration comprises a first zone and a second zone, and wherein the storing step comprises storing an availability of data storage units with respect to the zones.

15. A data storage system comprising:
system configuration change information embodied in a computer readable medium and including resultant data that is prospectively associated with a change in a system configuration of memory allocation of a memory space corresponding to a pending allocation request; and
means for updating the system configuration of memory allocation by saving the prospective system configuration change information before executing the pending allocation request.

* * * * *